United States Patent [19]

Kim

[11] Patent Number: 6,035,026
[45] Date of Patent: Mar. 7, 2000

[54] METHOD AND APPARATUS OF CALL CONFERENCING IN A TELEPHONE EXCHANGE SYSTEM

[75] Inventor: Ji-Sook Kim, Koyang, Rep. of Korea

[73] Assignee: SamSung Electronics Co., Ltd., Kyungki-do, Rep. of Korea

[21] Appl. No.: 09/104,113

[22] Filed: Jun. 25, 1998

[30] Foreign Application Priority Data

Jun. 27, 1997 [KR] Rep. of Korea ................ 1997-28038

[51] Int. Cl.[7] .................................................. H04M 3/42
[52] U.S. Cl. ...................... 379/202; 379/158; 379/204; 379/205
[58] Field of Search ............................ 379/157, 158, 379/160, 202, 204, 205

[56] References Cited

U.S. PATENT DOCUMENTS

| 4,232,198 | 11/1980 | Warman ............................ 179/18 BC |
| 4,475,193 | 10/1984 | Brown ............................... 370/124 |
| 4,514,594 | 4/1985 | Brown et al. ...................... 179/2.51 |
| 4,523,307 | 6/1985 | Brown et al. ...................... 370/30 |
| 4,665,545 | 5/1987 | Galensky et al. .................. 379/158 |
| 4,984,263 | 1/1991 | Eun ................................. 379/158 |
| 5,090,052 | 2/1992 | Nakajima et al. ................. 379/98 |
| 5,319,702 | 6/1994 | Kitchin et al. ................... 379/189 |
| 5,442,688 | 8/1995 | Katz ................................ 379/156 |
| 5,539,812 | 7/1996 | Kitchin et al. ................... 379/189 |
| 5,559,876 | 9/1996 | Alperovich ...................... 379/205 |
| 5,588,037 | 12/1996 | Fuller et al. ....................... 379/57 |
| 5,699,352 | 12/1997 | Kriete et al. ..................... 370/262 |
| 5,764,743 | 6/1998 | Goedken et al. ................. 379/156 |

Primary Examiner—Scott Wolinsky
Assistant Examiner—Bing Bui
Attorney, Agent, or Firm—Robert E. Bushnell, Esq.

[57] ABSTRACT

A method and apparatus for call conferencing between multiline subscribers in a telephone exchange system, the multiline subscribers having at least one phone number jointly and at least one common key, each common key representing a corresponding joint phone number. A common key of a corresponding joint phone number is pressed to set up a conference call while a multiline subscriber is communicating with or making a conference call to a subscriber.

16 Claims, 10 Drawing Sheets

```
SUBSCRIBER    SUBSCRIBER    SUBSCRIBER    SUBSCRIBER
    S             A             B             C

◄──SPEAKING(#1000)──►                              (S811)

◄──"HOLD TONE"── HOOK FLASH                        (S812)

──────CALLING SUBSCRIBER C──────►    (S813)
                              (#2000)

◄──────SPEAKING(#2000)──────►        (S814)

◄──PRESSING #1000 KEY                (S815)

────────IGNORING────────►            (S816)

◄──"HOLD TONE"  ◄──────SPEAKING(#2000)──────►      (S817)
```

FIG. 8A

METHOD AND APPARATUS OF CALL CONFERENCING IN A TELEPHONE EXCHANGE SYSTEM

CLAIM OF PRIORITY

This application makes reference to, incorporates the same herein, and claims all benefits accruing under 35 U.S.C. § 119 from an application Method Of Call Conferencing In A Telephone Exchange System earlier filed in the Korean Industrial Property Office on the $27^{th}$ day of Jun. 1997 and there duly assigned Ser. No. 28038/1997.

BACKGROUND OF THE INVENTION

1. Field of the Invention

The present invention relates to the conference function of a telephone exchange system, and more particularly to a method of call conferencing for conference participants to communicate directly with each other.

2. Related Art

Generally, the telephone exchange system performs the basic function to establish communications between any subscriber lines in the same and different exchanges, between any subscriber line and any sub scriber's extension line, and between extension lines in the same private branch exchange. In addition to the basic function, the exchange system provides various convenient functions in the idle and busy states such as last number redial, speed dial, do-not-disturb, hold, and conference functions.

U.S. Pat. No. 4,475,193 entitled Power Line Carrier Multi Telephone Extension System For Full Duplex Conferencing Between Telephones to Brown discloses a power line carrier telephone extension system for transmitting electrical signals between the telephone line and an extension telephone over the AC electric power line available at a telephone subscriber's premises, that includes a main station for processing signals between the subscriber's telephone line and power lines and an extension telephone of the system that plugs into the power line. Means are disclosed that provides for a plurality of such extension telephones all of which can place calls to the telephone line, answer calls from the telephone line and conference together in full duplex communication.

U.S. Pat. No. 4,514,594 entitled Power Line Carrier Telephone Extension System For Full Duplex Conferencing Between Telephones And Having Telephone Call Hold Capability to Brown et al. disclose a power line carrier telephone extension system for transmitting electrical signals between the telephone line and one or more extension telephones over the AC electric power line available at a telephone subscriber's premises, that includes a main station for processing signals between the subscriber's telephone line and power lines and one or more extension telephones of the system that plugs into the power line, all of which can place calls to the telephone line, answer calls from the telephone line and conference together in full duplex communication. Means are disclosed that at the extension telephones for initiating a telephone line hold signal that is transmitted over the power line to the main station where the hold signal is detected and initiates connecting a hold impedance across the telephone line.

U.S. Pat. No. 4,523,307 entitled Power Line Carrier Multi Telephone Extension System For Full Duplex Conferencing And Intercom Between Telephones to Brown et al disclose a power line carrier telephone extension system for transmitting electrical signals between the telephone line and an extension telephone over the AC electric Power line available at a telephone subscriber's premises, that includes a main station for processing signals between the subscriber's telephone line and power lines and two or more extension telephones of the system that plug into the power line. Means are disclosed that provides for two or more of the system telephones to communicate without going on the telephone line (Intercom), even while another system telephone is engaged in an outside telephone call and means are further disclosed to provide for all telephones of the system to conference in Intercom.

U.S. Pat. No. 4,665,545 entitled Communication System Having Multi-Mode Line Selection Buttons to Galensky et al. disclose a communication system that includes station sets having one or more function enable buttons and a plurality of line access buttons. It is disclosed that the function enable buttons include the extension, transfer and send message buttons. Each line select button is disclosed as being associated with a communication line and with the station set associated with that line. Operation of a function enable button is disclosed to initiate the feature associated with that button and also changes the function of a line select button from a line access button to an auto-dial select button for dialing the station associated with the line select button.

U.S. Pat. No. 4,984,263 entitled Break-In Method In A Key System to Eun discloses a break-in method and a circuit in a key system for switching a key system to a conference-call state by use of a conference-call circuit. In the break-in method, it is disclosed that when an attendant perceives a telephone subscriber on the line, the attendant breaks in forcefully upon the subscriber's call currently on the line, changing the present call to a conference call. Thereafter, it is disclosed that if the attendant hangs on the phone, the subscriber having waited for being switched breaks into the conference-call replacing the attendant.

U.S. Pat. No. 5,090,052 entitled Telephone System With Multiple Extension Telephones to Nakajima et al. disclose an improved telephone system in which a plurality of telephone units connected to a common telephone line is directly connected to an outside telephone line, with each telephone unit disclosed as containing complete capability for making outside calls, for making extension calls, and for the automatic exchange control of the use of the common telephone line. It is disclosed the telephone system provides functions, including making multiple simultaneous calls on a single telephone line without requiring separate exchange equipment, additional extension or signal lines. Also, it is disclosed telephone units in this system can be connected to more than one outside telephone line to expand the system capacity.

U.S. Pat. No. 5,319,702 entitled Method And Apparatus For Detecting And Responding To Hook Flash Events Occurring On A Remote Telephone to Kitchin et al. disclose methods and apparatus for use in conjunction with a telephone or with equipment in telecommunication with a remote telephone. It is disclosed apparatus provides an indication as to whether a remote party using the remote telephone has performed a specific act causing the generation of a hook flash-type signal which is detected by the apparatus. It is disclosed the apparatus includes software for cooperating with the energy detector to detect a specific event(s) occurring on the telephone line during a predetermined maximum time window following the detection of a specific pulse, with the detection of the specific event(s) providing an indication as to whether the remote party has performed a specific act such as attempting to initiate a 3-way conference call.

U.S. Pat. No. 5,442,688 entitled Multiple Party Telephone Control System to Katz discloses to interface a primary telephone terminal with a vast number of remote terminals through a telephone network, parties at the remote terminals are individually screened to attain a select group. It is disclosed that bridged together, the select group is preliminarily informed of the status of the interface by a voice generator and, accordingly, the multitude of connections are synchronized for the interface. On cue, the select group is disclosed as being coupled to the primary telephone terminal for unilateral communications. Deviations from the unilateral communication are disclosed as including select bilateral communication for a few of the remote terminals and digital communication from the remote terminals by push button as for polling applications.

U.S. Pat. No. 5,539,812 entitled Method And Apparatus For Detecting An Attempted Three-Way Conference Call On A Remote Telephone to Kitchin et al. disclose methods and apparatus for use in connection with a telecommunication between a local telephone and a remote telephone, which are disclosed as being capable of detecting whether one of the parties to the communication has attempted to initiate a three-way, i.e., conference, call by using a hook-flash signal.

U.S. Pat. No. 5,588,037 entitled Remote Access Telephone Control System, to Fuller et al. disclose a telephone switching and control system connected to a telephone network for providing telephone calling services to an authorized user. It is disclosed the telephone switching and control system includes at least one switch for concurrently servicing a plurality of users, and at least one controller for receiving user authorization information, controlling the at least one switch and, during a call from the user, permitting that call to be extended to one or more network addresses in a series of extensions of that call without requiring the user to go on hook. A method is also disclosed of providing telephone calling services to an authorized user, the method including (a) concurrently providing telephone services to a plurality of users and (b) upon receiving user authorization information during a call from a user, permitting the user to extend that call to one or more network addresses in a series of extensions of that call without requiring the user to go on hook between extensions of that call.

U.S. Pat. No. 5,699,352 entitled Distributed Teleconferencing System to Kriete et al. disclose a distributed teleconferencing bridge system that allows an attendant to control multiple conferences on multiple bridges through a network interface unit. It is disclosed that the attendant can add or delete conferees with a minimum of inconvenience to the conferees while maximizing the use of the bridges by setting up multiple conferences on multiple bridges from a single operating console. Multiple consoles are disclosed as allowing multiple operators to control any number of conferences.

U.S. Pat. No. 5,764,743 entitled Method Of Controlling Operation Of A Multi-Line Telephone Apparatus to Goedken et al. disclose a method of operating a multi-line telephone apparatus including, when a phone line switch is actuated, taking a phone line off-hook when the line is on-hook and bringing the phone line on-hook when the line is off-hook. It is disclosed when the phone line is off-hook and a hold switch is actuated, a hold condition is placed on the phone line when the line is not on hold and removed when the line is on hold. It is disclosed when a phone call is established on a first phone line and a conference switch is actuated, a second phone line is brought off-hook and a conference call connection is established. It is disclosed a common conventional method of making a conference call, which includes actuations of hold switch and phone line switches is retained.

An exchange system exemplary of contemporary practice in the art includes an exchange circuit, a C.O. line interface, an extension interface, and a controller. Besides, it is well known that such exchange system further comprises a dual tone multi-frequency (DTMF) generator, a DTMF receiver, and a ring generator, etc. in addition to such constituent elements. The C.O. line interface interfaces to the subscriber loop, and the extension interface interfaces to the extension subscribers' lines at the user terminals of which general telephone sets or multi-function telephones such as a digital telephone capable of providing various convenient services to subscribers can be connected.

The outer construction of the digital telephone capable of being connected as an extension subscriber to the above exchange system comprises a handset, a liquid crystal display, function keypads, a pushbutton dialing pad, and a volume control. The above function keypad comprises a plurality of keys by which a plurality of variable functions can be set, and the function keypad comprises a plurality of fixed keys such as REDIAL (redialing key), SPEED (speed dialing key), DND (do-not-disturb key), PAGING (paging key), XFER (transfer key), CONN (reconnetion key), HOLD (speak hold key), SPEAKER (speaker mode key). As described above, the above digital telephone set is provided with a variable function keypad and a fixed function keypad so that the subscribers can receive various convenient services to which the conference function according to the present invention is related.

The conference function exemplary of contemporary practice in the art includes the steps of calling another subscriber after holding the line of the current speaking partner during conference, and adding such another partner to the conference group by pressing the conference function key or entering a conference function code when receiving the corresponding subscriber's response. To describe more concretely, the presiding subscriber must hold first the current speaking partner during a two-way conference, and then call another subscriber (on the extension line or the subscriber line), whereby when the called subscriber responds and speaking is established, the presiding subscriber presses the conference function key (CONF key) or enters the prescribed conference code (XFER, #,7) so that the three-way conference between the subscribers can be started.

As described above, in the conference call method exemplary of contemporary practice in the art, a presiding subscriber participating in the current conference must hold first the speaking partner and then call another party to additionally participate, thereupon pressing the conference function key or entering the conference function code to establish such additional speaking participation, which means consequently that the conference call can be established only by a one-sided request for conference. In other words, participants may participate in a conference irrelevant to their wishes, and an intending participant can not participate in a conference if not called by the presiding party.

Besides, a digital telephone set serving as an extension subscriber can be set for a multiline subscriber, wherein the multiline subscriber means a telephone set that can use not only its own primary line but also another subscriber line as a secondary line. That is, a multiline subscriber's phone number is owned jointly by several subscribers, wherein such a multiline telephone set enables phone communication by using its own phone number as well as another subscriber's phone number.

The function keypad of such a multiline telephone set is provided with a plurality of keys (loop keys) corresponding to the respective phone numbers. Therefore, when receiving an incoming signal, the multiline telephone set blinks the lamp of the corresponding multiline loop key, thereby generating a ringing tone to indicate that the line is being called. Even when a multiline subscriber answers the telephone call, the lamp of the above relevant multiline loop key continues to blink, so that another multiline subscriber can know which line is currently busy. Further, even such a multiline subscriber can perform the conference function in the same manner as above described.

The conference function exemplary of contemporary practice in the art has the following drawbacks. First, in order to make a conference call, a complicated procedure such as holding, speaking, and function keying or function code entry must be performed. Second, the conference function can not be performed unless a subscriber invites another subscriber to the conference. Third, when a third party is invited to the conference, one of the current conference participants must be placed on hold and wait for a further response. Fourth, for example, when a person transfers an incoming signal to another person, the person must actuate the hold key and wait for other person's response.

SUMMARY OF THE INVENTION

Accordingly, it is an object of the present invention to provide a method for simplifying the conference call procedure in the exchange system.

It is another object of the present invention to reduce the time required for the conference call.

It is still another object of the present invention to enable the intending participant to participate in the conference call.

It is still a further object of the present invention to eliminate the inconvenience in which one of subscribers must be placed on hold and wait for further response during conference calling.

According to one embodiment of the present invention, there is provided a method for call conferencing between multiline subscribers in a telephone exchange system, the multiline subscribers having at least one or more phone numbers jointly and provided with common keys representing the phone numbers, the method including pressing at least one common key of a corresponding phone number to call conference while a multiline subscriber is communicating with or making a conference call to a subscriber.

According to another embodiment of the present invention, there is provided a method for call conferencing between multiline subscribers in a telephone exchange system, the multiline subscribers having at least one or more phone numbers jointly and provided with common keys representing the phone numbers, including the steps of pressing at least one common key of a corresponding phone number by another multiline subscriber to call conference while a certain multiline subscriber is communicating with or making a conference call to a certain multiline subscriber, verifying the service classes of the certain multiline subscriber and the certain subscriber to approve a conference group between the certain multiline subscriber, the certain subscriber, and the another multiline subscriber or ignore the conference call. The conference call is ignored when any one of both the certain multiline subscriber and the certain subscriber is registered for the privacy class.

According to a further embodiment of the present invention, there is provided a method for call conferencing between a first multiline subscriber communicating with or making a conference call to a first subscriber through a first multiline phone number and a second multiline subscriber communicating with second subscriber through a second multiline phone number in a telephone exchange system including the steps of pressing the common key of the first multiline phone number by the second multiline subscriber after the second multiline subscriber puts the line on the hook or holds the second subscriber, releasing the speaking between the second multiline subscriber and the second subscriber, and forming a conference group between the first multiline subscriber, the first subscriber, and the second multiline subscriber.

According to yet another embodiment of the present invention, there is provided a method for call conferencing between a first multiline subscriber communicating with or making a conference call to a first subscriber through a first multiline phone number and a second multiline subscriber communicating with a second subscriber through a second multiline phone number in a telephone exchange system, including the steps of pressing the common key of the first multiline phone number by the second multiline subscriber after the second multiline subscriber puts the line on the hook or holds the second subscriber, and forming a conference group between the first multiline subscriber, the first subscriber, and the second multiline subscriber.

According to still another embodiment of the present invention, there is provided a method for call conferencing between one of a first multiline subscriber and a first subscriber communicating with each other through a first multiline phone number and a second multiline subscriber in a telephone exchange system, including the steps of pressing the common key of a second multiline phone number by the first multiline subscriber or the first subscriber after making a hook flash, forming a conference group between the first multiline subscriber or the first subscriber and the second multiline subscriber, and ignoring a third multiline subscriber pressing the common key of the first multiline phone number, and maintaining the speech channel between the first multiline subscriber or the first subscriber and the second multiline subscriber.

According to yet a further embodiment of the present invention, there is provided a method for call conferencing between a first multiline subscriber having his or her own primary phone number and a second and a third multiline subscriber each having their own primary phone numbers and jointly holding the primary phone number of the first multiline subscriber as their secondary phone number while the second and third multiline subscribers are communicating with each other through the primary phone number of the first multiline subscriber in a telephone exchange system, including the steps of hooking off the handset of the first multiline subscriber to make a request for a conference, verifying the service classes of the second and third multiline subscribers to form a conference group between the first, second and third multiline subscribers or ignoring the request for the conference.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 8A and 8B are process flow diagrams illustrating the conference function according to a fourth embodiment of the present invention.

DETAILED DESCRIPTION OF THE PREFERRED EMBODIMENTS

The preferred embodiments of the present invention will now be described more specifically with reference to the drawings attached hereto. The terms to be hereinafter mentioned are defined in consideration of the functions according to the present invention. Since such terms can be also modified depending on the intentions or the practices of users and chip designers, such terms should not be construed in a limiting sense, but should be defined to encompass the overall contents and functions of the present invention as set forth in the following specification.

Figure 1:
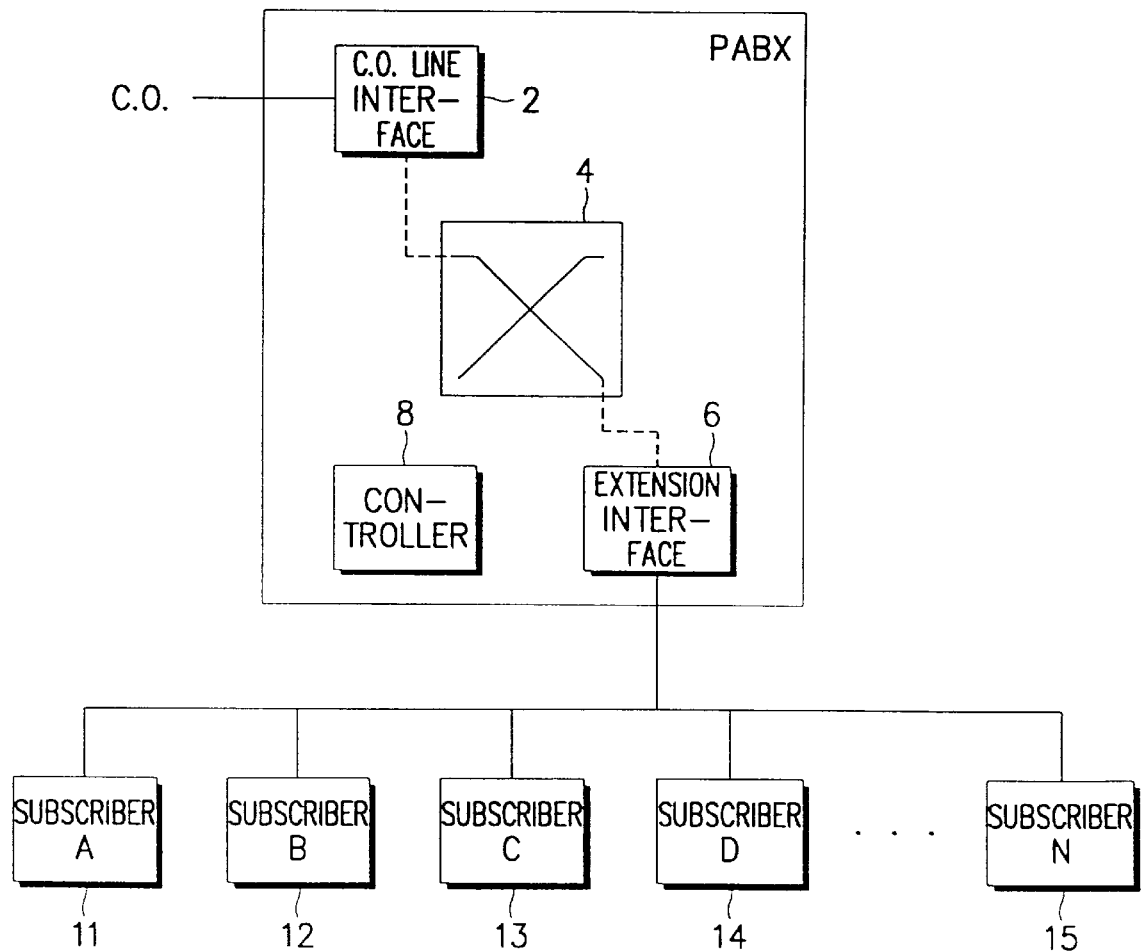
FIG. 1 is a block diagram illustrating the interconnection of a private automatic branch exchange (PABX) exemplary of contemporary practice in the art, as can be used in the present invention.

Referring to FIG. 1, an exchange system exemplary of contemporary practice in the art as can be used in the present invention includes a exchange circuit 4, a C.O. line interface 2, an extension interface 6, and a controller 8. Besides, it is well known that such exchange system further comprises a dual tone multi-frequency (DTMF) generator, a DTMF receiver, and a ring generator, etc. in addition to such constituent elements. The C.O. line interface 2 interfaces to the subscriber loop, and the extension interface 6 interfaces to the extension subscribers' lines 11–15 at the user terminals of which general telephone sets or multi-function telephones such as a digital telephone capable of providing various convenient services to subscribers can be connected.

Figure 2:
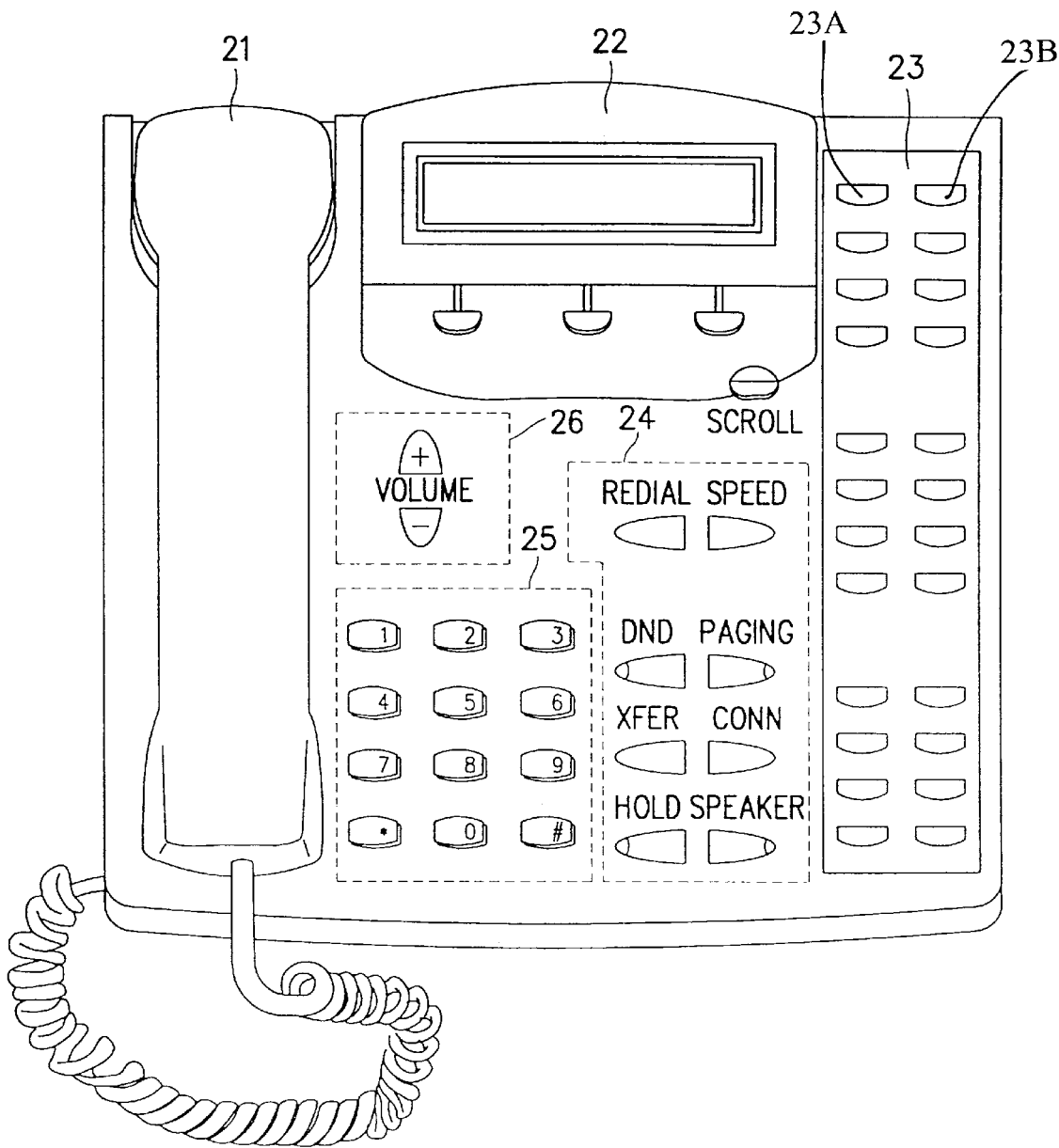
FIG. 2 is a descriptive model picture illustrating the outer construction of a digital telephone set as can be used in the present invention.

Referring to FIG. 2, the outer construction of the digital telephone capable of being connected as an extension subscriber to the above exchange system comprises a handset 21, a liquid crystal display 22, function keypads 23 and 24, a pushbutton dialing pad 25, and a volume control 26. The above function keypad 23 comprises a plurality of keys by which a plurality of variable functions can be set, and the function keypad 24 comprises a plurality of fixed keys such as REDIAL (redialing key), SPEED (speed dialing key), DND (do-not-disturb key), PAGING (paging key), XFER (transfer key), CONN (reconnetion key), HOLD (speak hold key), SPEAKER (speaker mode key). As described above, the above digital telephone set is provided with a variable function keypad 23 and a fixed function keypad 24 so that the subscribers can receive various convenient services to which the conference function according to the present invention is related.

Figure 3A:
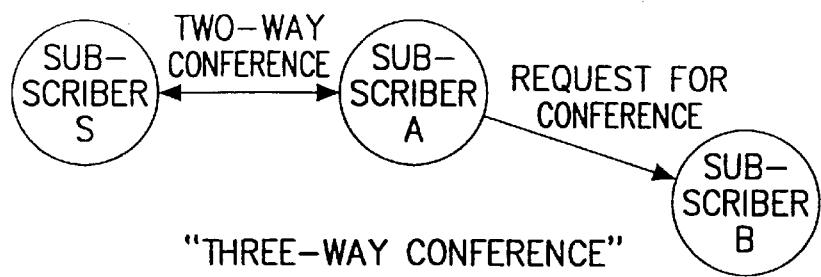
FIG. 3A is a descriptive diagram and FIG. 3B is a flow chart, both illustrating the conference function exemplary of contemporary practice in the art.
Figure 3B:
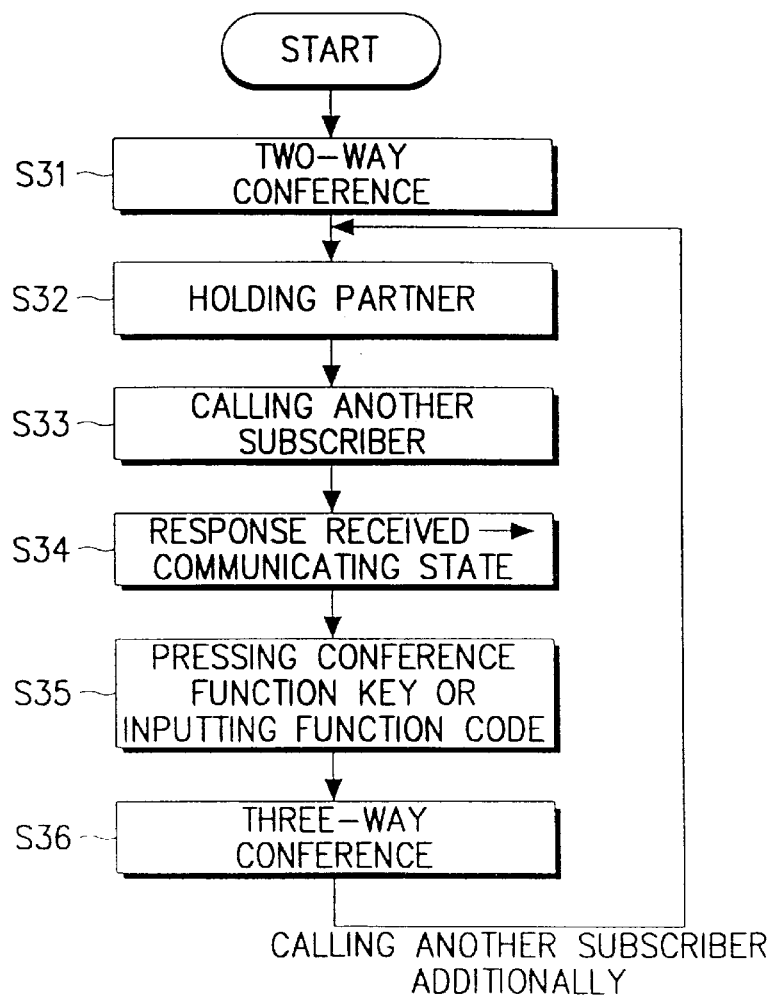

Referring to FIGS. 3A and 3B, the conference function exemplary of contemporary practice in the art includes the steps of calling another subscriber after holding the line of the current speaking partner during conference, and adding such another partner to the conference group by pressing the conference function key or entering conference function code when receiving the corresponding subscriber's response. To describe more concretely, the presiding subscriber A during a two-way conference at step S31 must hold first the current speaking partner S at stem S32, and then at step S33 call another subscriber B (on the extension line or the subscriber line), whereby when the called subscriber B responds and speaking is established at step S34, the presiding subscriber A presses the conference function key (CONF key) or enters the prescribed conference code (XFER, #, 7) at step S35 so that the three-way conference at step S36 between the subscribers A, B, and S can be started.

Figure 4:
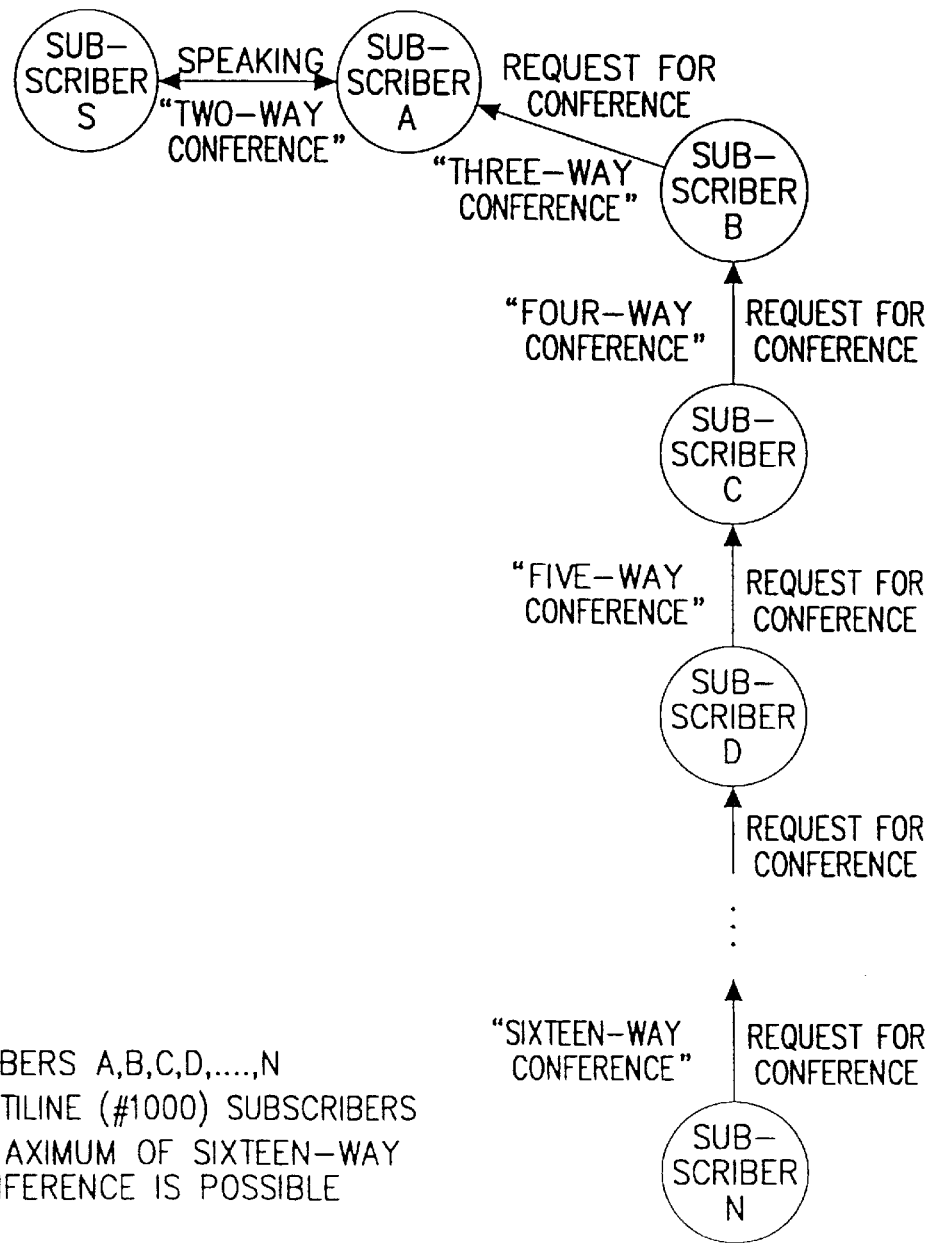
FIG. 4 is a process flow diagram illustrating the conference function according to the present invention.

FIG. 4 is a descriptive process flow diagram illustrating the call conferencing method according to the present invention, such as can be implemented by the controller 8 of the exchange system of FIG. 1, with the operation program being stored in a built-in memory or an external memory. The method, instructed in FIG. 4 includes when the subscriber (i.e., third party) B requests a conference while the subscriber S (first party) and the subscriber (second party) A are engaged in a two-way conference call or communicating with each other, the conference call between the above three parties can be also established by simply pressing the common key 23 A (loop key) of the jointly owned phone number (FIG. 2). That is, when the multiline phone No. 1000 (common key 23A), for example, is owned jointly by the subscriber S, the subscriber A, and the subscriber B, and the subscriber S and the subscriber A are engaged in a two-way conference or communicating with each other, the subscriber B can check the light-emitting diode (LED) blinking on his telephone set to see speaking between the subscribers S and A.

According to the present invention, a conference call can be established not only by a third intending participant's request but also by the presiding party's request (a method exemplary of contemporary practice in the art of calling a third subscriber to be invited after holding the current partner). Such a conference call being established by the subscribers' requests according to the present invention as illustrated in FIG. 4 can include up to a maximum of sixteen subscribers, for example, at a time provided that sixteen subscribers jointly own the common multilines, the conference call being established by similarly pressing the common key (loop key) of the jointly owned phone number of the subscribers.

FIGS. 5–9 illustrate various embodiments of the call conferencing method of the present invention which are implemented by the controller 8 of the exchange system as shown in FIG. 1, with the operation program for the controller 8 being stored in a built-in memory or an external memory. In each of the above embodiments, when a third multiline subscriber B presses the common key 23A of the phone number #1000, for example, while multiline subscribers A and S are making a conference call or communicating with each other through the above phone number #1000, a conference call can be established between the above multiline subscribers A and S and the above intending multiline subscriber B, thereby assuming that the phone number #1000 is the primary phone number of the above multiline subscriber A, being jointly owned by the above multiline subscribers A, S, and B.

The following describes the operation according to the present invention in which a three-way conference call is established when a third subscriber requests the conference call while two subscribers are proceeding with a two-way conference or communicating with each other.

Figure 5:
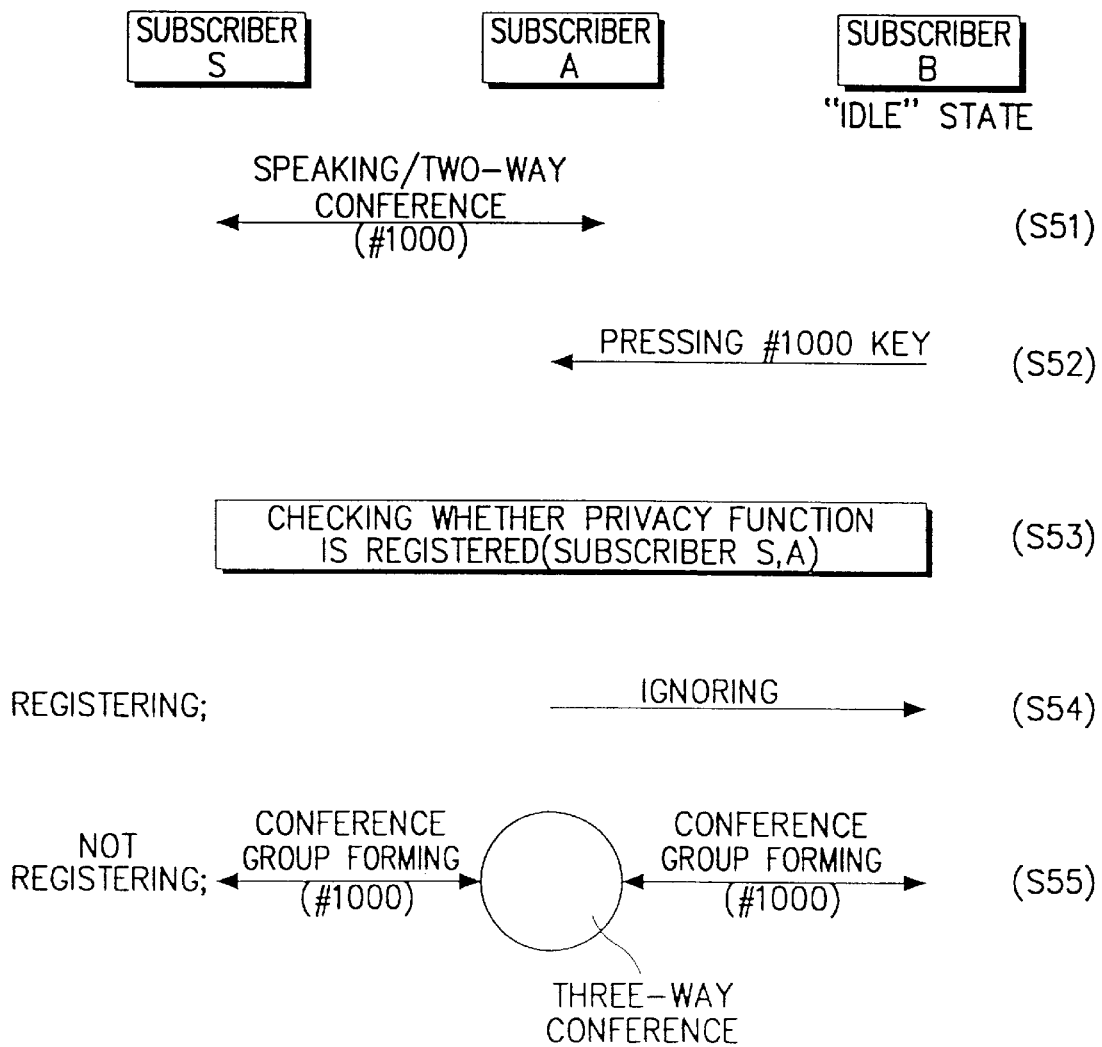
FIG. 5 is a process flow diagram illustrating the conference function according to a first embodiment of the present invention.

FIG. 5 illustrates the conference call operation when a third subscriber party B in an idle state makes a request for a conference in step S52 by pressing the common key 23A of the phone number #1000 while multiline subscriber A communicates with or makes a conference call to a specified subscriber in step S51. When multiline subscriber B makes request for a conference, the controller 8 verifies the service classes of multiline subscriber A and speaking partner S thereof in step S53. The service class to be verified in this step S53 is the privacy function which enables any one of both the multiline subscriber A and the speaking partner S to refuse the interference of a third party from the outside.

After verifying the service classes of the multiline subscriber A and the speaking partner S, the controller 8 forms a conference group between the above multiline subscriber A, the speaking partner S, and the third intending multiline subscriber in step S55, or ignores the third multiline subscriber's request for conference in step S54 according to the verified result of the aforementioned service class. That is, if any one of both the multiline subscriber A and the speaking partner S is registered for the privacy class, the controller 8 ignores the above third subscriber's request for conference, and otherwise forms a conference group between the above multiline subscriber A, the speaking partner S, and the third intending multiline subscriber.

Figure 6A:
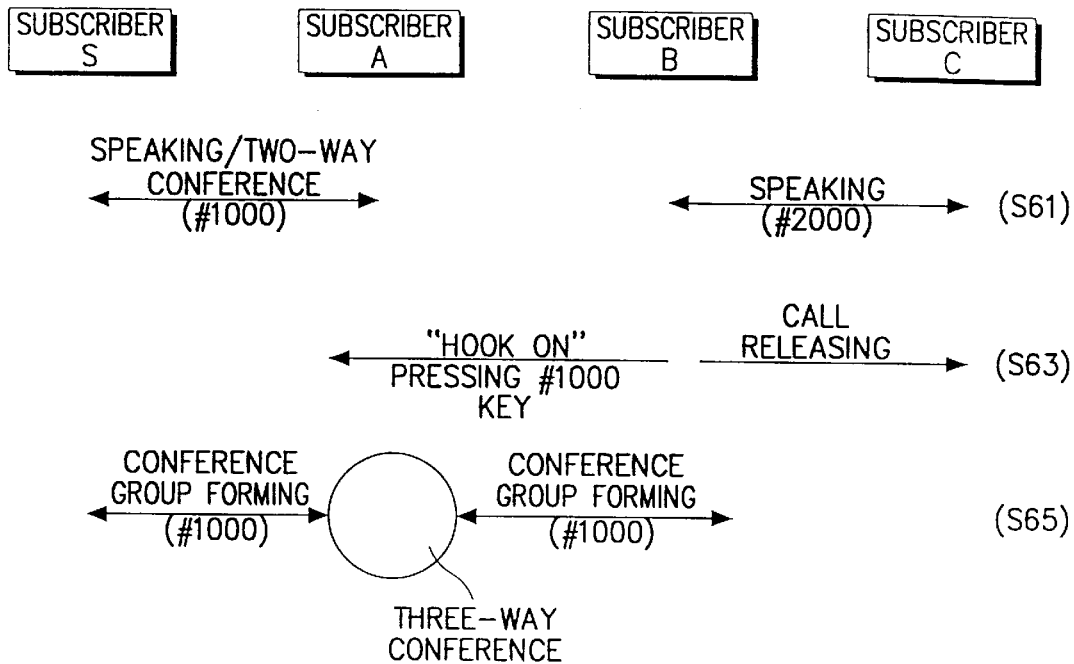
FIG. 6A and 6B are the process flow diagrams illustrating the conference function according to a second embodiment of the present invention.

FIG. 6A illustrates in step S61 that while a first multiline subscriber A is communicating with or making a conference call to a first subscriber S through the first multiline phone number #1000 on the one hand, and a second multiline subscriber B is communicating with or making a conference call to a second subscriber C through the second multiline phone number #2000 (common key 23B, FIG. 2) on the other hand, the above second multiline subscriber B puts the line on the hook and thereupon presses the common key 23A of the first multiline phone number #1000 to request for a conference, whereby the call between the second multiline subscriber B and the second subscriber C is released in step S63 and a conference group is formed between the multiline subscriber A, the first subscriber S, and the second multiline subscriber B in step S65.

Figure 6B:
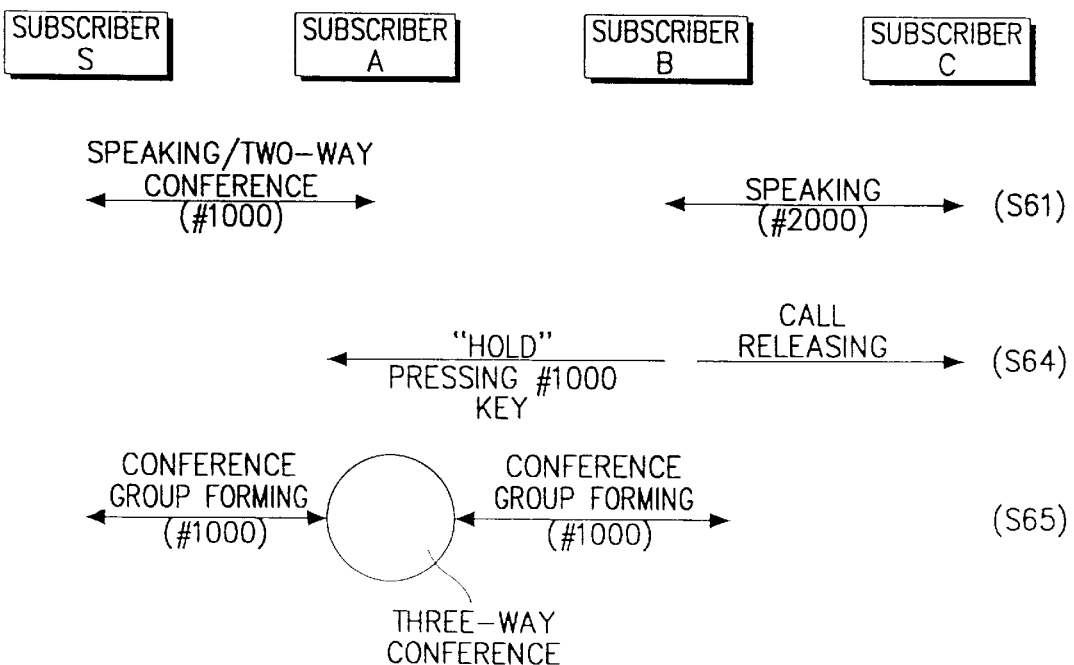

FIG. 6B, illustrates that in step S61 while the first multiline subscriber A is communicating with or making a conference call to the first subscriber S through the first multiline phone number #1000 on the one hand, and the second multiline subscriber B is communicating with or making a conference call to the second subscriber C through the second multiline phone number #2000 on the other hand, the second multiline subscriber B holds the second subscriber C, thereupon requesting for a conference by pressing the common key of the multiline phone number #1000, whereby the call between the second multiline subscriber B and the second subscriber C is released in step S64 and a conference group is formed between the multiline subscriber A, the first subscriber S, and the second multiline subscriber B in step S65.

Figure 7:
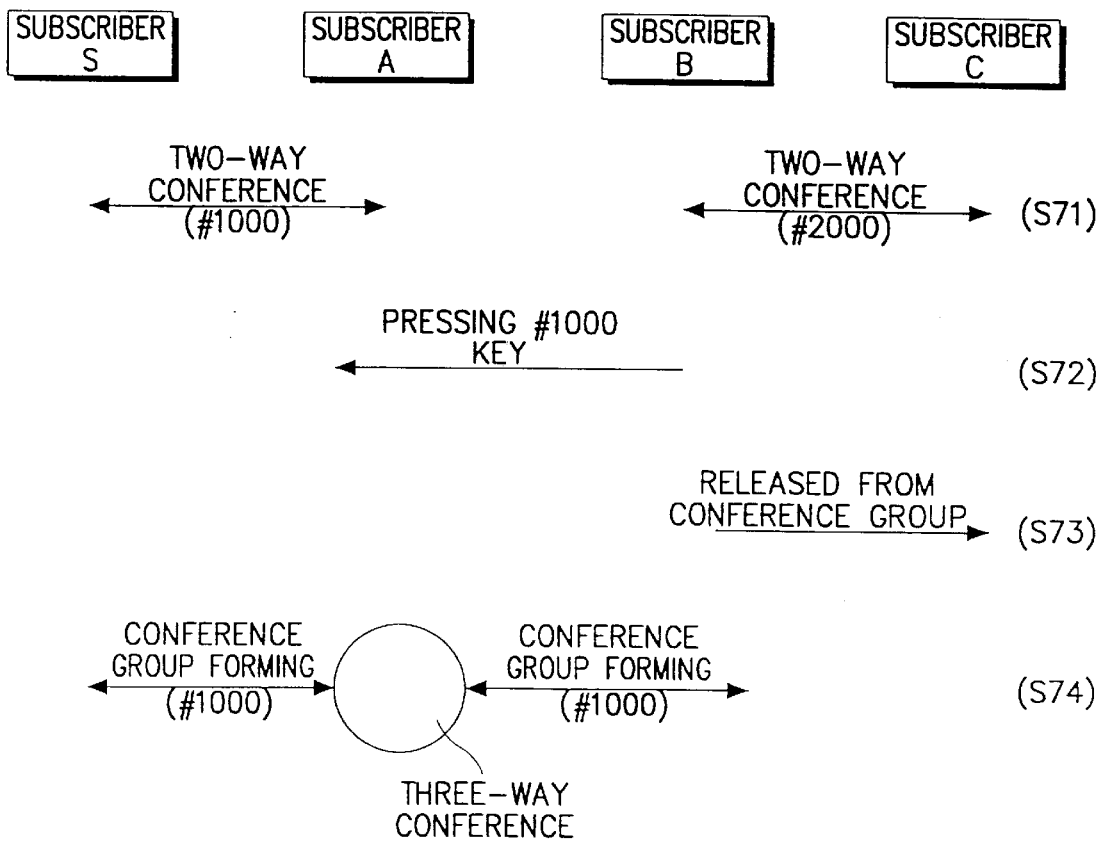
FIG. 7 a process flow diagram illustrating the conference function according to a third embodiment of the present invention.

FIG. 7 illustrates in step S71 that while a first multiline subscriber A and a first subscriber S are proceeding with a two-way conference through the first multiline phone number #1000 on the one hand, and a second multiline subscriber B and a second subscriber C are proceeding with a two-way conference through the second multiline phone number #2000 on the other hand, the second multiline subscriber B requests for a conference by pressing the common key 23A of the first multiline phone number #1000, whereby the second multiline subscriber B is released in step S73 from the conference group formed before and joins the conference group separately formed between a first multiline subscriber A and the first subscriber S in step S74.

FIG. 8A, illustrates that while a first multiline subscriber A is communicating with a first subscriber S through a first multiline phone number #1000 in step S811, the first multiline subscriber A makes a hook flash and thereupon calls a second multiline subscriber C. That is, when the first multiline subscriber A makes a hook flash in step S812 and thereupon calls the second multiline subscriber C by means of the second multiline phone number #2000 in step S813, the speech channel between the first and second multiline subscribers A and C is formed in step S814.

Further, referring to FIG. 8A, when the above first multiline subscriber A calls the second multiline subscriber C after making a hook flash, the holding tone is sent to the hook-flashed speaking partner S in step S812. Then, if a third multiline subscriber B presses the common key 23A of the first multiline phone number #1000 in step S815, the request for a conference corresponding to the common key pressed is ignored in step S816, and the speech channel between a first and second multiline subscribers A and C is continuously maintained in step S817.

Figure 8B:

FIG. 8B illustrates that while the first multiline subscriber A is communicating with a first subscriber S through the first multiline phone number #1000 in step S821, the first subscriber S makes a hook flash in step S822 and thereupon calls the second multiline subscriber C by means of the second multiline phone number #2000. That is, when the first subscriber S calls the second multiline subscriber C by means of the common key 23B of the second multiline phone number #2000 in step S823 after making a hook flash in step S822, the speech channel between the first subscriber S and the second multiline subscriber C is formed in step S824.

Further, when the above first subscriber S calls the second multiline subscriber C after making a hook flash, the holding tone is sent to the hook-flashed speaking partner A in step S822. If a third multiline subscriber B then presses the common key 23A of a first multiline phone number #1000 in step S825, the request for conference corresponding to the common key pressed is ignored in step S826, and the speech channel between the first suscriber S and the second multiline subscriber C is continuously maintained in step S827.

Figure 9:
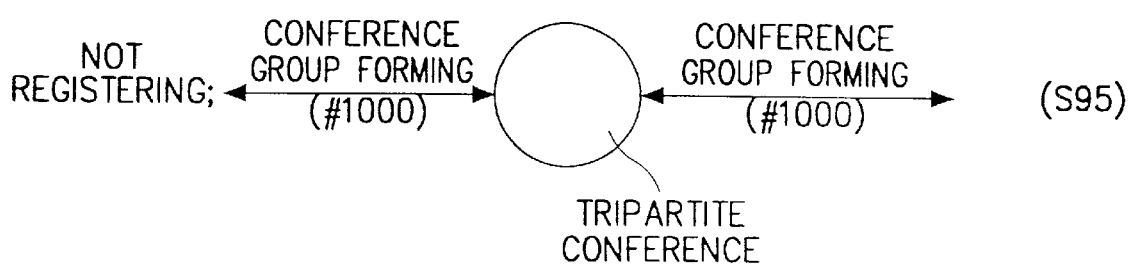
FIG. 9 is a process flow diagram illustrating the conference function according to a fifth embodiment of the present invention.

FIG. 9 illustrates that while a second multiline subscriber B and a third multiline subscriber C are communicating with each other in step S91 through the primary phone number #1000 of a first multiline subscriber A, the first multiline subscriber A makes the line off the hook in step S92 so as to request for a conference, wherein the first multiline subscriber A has only the primary phone number #1000, and the second and third multiline subscribers B and C each have their own primary phone numbers #2000 and #3000 respectively and jointly hold the primary phone number #1000 of the above first multiline subscriber A as their secondary phone number.

Further, referring to FIG. 9, when the first multiline subscriber A makes the line off the hook in step S92 while the second and third multiline subscribers B and C are communicating with each other through the primary phone number #1000 of the first multiline subscriber A in step S91, the controller 8 verifies the service classes of the second and third multiline subscriber B and C currently communicating with each other through the phone number # 1000 in step S93. After verifying the service classes in step S93, the controller 8 forms a conference group between the first, second, and third multiline subscribers A, B, and C in step S95, or ignores the request for a conference in step 94 according to the verified results of the service classes.

To describe in more detail referring to FIG. 9, if at least any one of both the second and third multiline subscribers B and C is registered for the privacy class, the communicating state between the second and third multiline subscribers B and C continues to be maintained in step S94, and otherwise the conference group among the first, second, and third multiline subscribers A, B, C is formed in step S95.

As described above, the conference call function according to embodiments of the present invention can be performed in various ways. Particularly, one point of the call conferencing method according to the present invention is that an intending third participant can make also requests for the conference call by simply pressing a common key. Therefore, the present invention has the advantages of reducing the time required to perform the complicated procedure of the conference call by enabling the participants to make requests for conference bilaterally without being unilaterally requested by a party. This is particularly useful for the incoming transfer between a person and the person's secretary, for example, whereby the person can personally answer telephone calls without handing over the handset to the person when the secretary receives incoming calls to be transferred to the person.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A method for call conferencing a plurality of multiline subscribers in a telephone exchange system, comprising the steps of:
   providing at least one phone number jointly for a plurality of multiline subscribers and at least one common key, each common key representing a corresponding joint phone number;
   pressing at least one common key corresponding to a joint phone number to set up a conference call by one multiline subscriber of said plurality of multiline subscribers while another multiline subscriber of said plurality of multiline subscribers is presently communicating with a first subscriber or in the process of making a conference call to the first subscriber;
   verifying a service class of the another multiline subscriber and the first subscriber to approve a conference group among the another multiline subscriber, the first subscriber, and the one multiline subscriber;
   call conferencing the conference group if approved in the verifying step; and
   ignoring a conference call for the conference group if in the verifying step the conference group is not approved.

2. The method of claim 1, further comprised of the conference call for the conference group being ignored when at least one of the another multiline subscriber and the first subscriber is registered for a privacy class.

3. A method for call conferencing in a telephone exchange system, comprising the steps of:
   providing at least one phone number jointly for a plurality of multiline subscribers and at least one common key, each common key representing a corresponding joint phone number;
   pressing a common key of a first multiline phone number by a second multiline subscriber of the plurality of multiline subscribers after the second multiline subscriber places a line for a second multiline phone number on hook or places a second subscriber on hold, while a first multiline subscriber of the plurality of multiline subscribers is presently communicating with a first subscriber or in the process of making a conference call to the first subscriber through the first multiline phone number, the second multiline subscriber presently communicating with the second subscriber through the second multiline phone number in the telephone exchange system;
   releasing the line for the second multiline phone number between the second multiline subscriber and the second subscriber; and
   forming a conference group among the first multline subscriber, the first subscriber, and the second multiline subscriber.

4. A method for call conferencing in a telephone exchange system, comprising the steps of:
   providing at least one phone number jointly for a plurality of multiline subscribers and at least one common key, each common key representing a corresponding joint phone number;
   pressing a common key of a first multiline phone number by a second multiline subscriber of the plurality of multiline subscribers after the second multiline subscriber places a line for a second multiline phone number on hook or places a second subscriber on hold, while a first multiline subscriber of the plurality of multiline subscribers is presently communicating with a first subscriber or in the process of making a conference call to the first subscriber through the first multiline phone number, the second multiline subscriber presently communicating with the second subscriber through the second multiline phone number in the telephone exchange system; and
   forming a conference group among the first multiline subscriber, the first subscriber, and the second multiline subscriber.

5. A method for call conferencing in a telephone exchange system, comprising the steps of:
   providing at least one phone number jointly for a plurality of multiline subscribers and at least one common key, each common key representing a corresponding joint phone number;
   pressing a common key of a second multiline phone number for a second multiline subscriber of the plurality of multiline subscribers by a first multiline subscriber of the plurality of multiline subscribers after the first multiline subscriber makes a hook flash and, alternatively, making a hook flash by a first subscriber, the first multiline subscriber and the first subscriber presently communicating with each other through a first multiline phone number in the telephone change system;

forming a conference group between the second multiline subscriber and one of the first multiline subscriber and the first subscriber; and ignoring a third multiline subscriber of the plurality of multiline subscribers pressing a common key of the first multiline phone number, thereby maintaining the conference group formed in the forming step.

6. The method of claim 5, further comprised of a holding tone being additionally sent to the hook-flashed one of the first multiline subscriber and the first subscriber.

7. A method for call conferencing in a telephone exchange system, comprising the steps of:

providing a primary phone number for a first multiline subscriber of a plurality of multiline subscribers in the telephone exchange system;

providing a primary phone number for a second multiline subscriber of the plurality of multiline subscribers and a primary phone number for a third multiline subscriber of the plurality of multiline subscribers in the telephone exchange system, the second multiline subscriber and the third multiline subscriber jointly holding the primary phone number of the first multiline subscriber as a secondary phone number;

placing off hook a handset of the first multiline subscriber to make a request for a conference, while the second multiline subscriber and the third multiline subscriber are presently communicating with each other through the primary phone number of the first multiline subscriber in the telephone exchange system;

verifying a service class of the second multiline subscriber and the third multiline subscriber to form a conference group among the first multiline subscriber, the second multiline subscriber, and the third multiline subscriber;

forming the conference group if the verifying step indicates an approval for formation of the conference group; and ignoring the request for forming the conference group if the verifying step indicates formation of the conference group is not approved.

8. The method of claim 7, further comprised of communication between the second multiline subscriber and the third multiline subscriber being maintained if at least one of the second multiline subscriber and the third multiline subscriber is registered for a privacy class, and, if not, the conference group being formed in the forming step among the first multiline subscriber, the second multiline subscriber, and the third multiline subscriber.

9. A telephone exchange system, comprising:

a telephone exchange system having a controller for implementing call conferencing in the telephone exchange system, the telephone exchange system providing at least one phone number jointly for a plurality of multiline subscribers; and a plurality of telephones for the telephone exchange system, at least one of the plurality of telephones having at least one common key, each common key representing a corresponding joint phone number; and when at least one common key of a corresponding joint phone number to set up a conference call is pressed by one multiline subscriber of said plurality of multiline subscribers while another multiline subscriber of said plurality of multiline subscribers is presently communicating with a first subscriber or in the process of making a conference call to the first subscriber, the controller for the telephone exchange system:

verifying a service class of the another multiline subscriber and the first subscriber to approve a conference group among the another multiline subscriber, the fist subscriber, and the one multiline subscriber, call conferencing the conference group if the conference group is approved through the verifying of the service class, and ignoring a conference call for the conference group if the conference group is not approved through the verifying of the service class.

10. The telephone exchange system of claim 9, further comprised of the conference call for the conference group being ignored by the controller when at least one of the another multiline subscriber and the first subscriber is registered for a privacy class.

11. A telephone exchange system, comprising:

a telephone exchange system having a controller for implementing call conferencing in the telephone exchange system, the telephone exchange system providing at least one phone number jointly for a plurality of multiline subscribers; and a plurality of telephones for the telephone exchange system, at least one of the plurality of telephones having at least one common key, each common key representing a corresponding joint phone number; and when a common key of a first multiline phone number is pressed by a second multiline subscriber of the plurality of multiline subscribers after the second multiline subscriber places a line for a second multiline phone number on hook or places a second subscriber on hold, while a first multiline subscriber of the plurality of multiline subscribers is presently communicating with a first subscriber or in the process of making a conference call to the first subscriber through the first multiline phone number, the second multiline subscriber presently communicating with the second subscriber through the second multiline phone number in the telephone exchange system, the controller for the telephone exchange system:

releasing the line for the second multiline phone number between the second multiline subscriber and the second subscriber, and forming a conference group among the first multiline subscriber, the first subscriber, and the second multiline subscriber.

12. A telephone exchange system, comprising:

a telephone exchange system having a controller for implementing call conferencing in the telephone exchange system, the telephone exchange system providing at least one phone number jointly for a plurality of multiline subscribers; and a plurality of telephones for the telephone exchange system, at least one of the plurality of telephones having at least one common key, each common key representing a corresponding joint phone number; and when a common key of a first multiline phone number is pressed by a second multiline subscriber of the plurality of multiline subscribers after the second multiline subscriber places a line for a second multiline phone number on hook or places a second subscriber on hold, while a first multiline subscriber of the plurality of multiline subscribers is presently communicating with a first subscriber or in the process of making a conference call to the first subscriber through the first multiline phone number, the second multiline subscriber presently communicating with the second subscriber through the second multiline phone number in the telephone exchange system, the controller for the telephone exchange system forming a conference group among the first multiline subscriber, the first subscriber, and the second multiline subscriber.

13. A telephone exchange system, comprising:

a telephone exchange system having a controller for implementing call conferencing in the telephone exchange system, the telephone exchange system providing at least one phone number jointly for a plurality of multiline subscribers; and a plurality of telephones for the telephone exchange system, at least one of the plurality of telephones having at least one common key, each common key representing a corresponding joint phone number; and when a common key of a second multiline phone number for a second multiline subscriber of the plurality of multiline subscribers is pressed by a first multiline subscriber of the plurality of multiline subscribers after the first multiline subscriber makes a hook flash and, alternatively, when a hook flash is made by a first subscriber, the first multiline subscriber and the first subscriber presently communicating with each other through a first multiline phone number in the telephone exchange system, the controller for the telephone exchange system:

forming a conference group between the second multiline subscriber and one of the first multiline subscriber and the first subscriber, and ignoring a third multiline subscriber of the plurality of multiline subscribers when a common key of the first multiline phone number is pressed by the third multiline subscriber, thereby maintaining the conference group.

14. The telephone exchange system of claim 13, further comprised of a holding tone being additionally sent by the controller to the hook-flashed one of the first multiline subscriber and the first subscriber.

15. A telephone exchange system, comprising:

a telephone exchange system having a controller for implementing call conferencing in the telephone exchange system, the telephone exchange system providing a primary phone number for a first multiline subscriber of a plurality of multiline subscribers in the telephone exchange system, and the telephone exchange system providing a primary phone number for a second multiline subscriber of the plurality of multiline subscribers and a primary phone number for a third multiline subscriber of the plurality of multiline subscribers in the telephone exchange system, the second multiline subscriber and the third multiline subscriber jointly holding the primary phone number of the first multiline subscriber as a secondary phone number in the telephone exchange system; and a plurality of telephones for the telephone exchange system; and when a handset of a telephone of the first multiline subscriber of the plurality of telephones is placed off hook to make a request for a conference, while the second multiline subscriber and the third multiline subscriber are presently communicating with each other on respective telephones of the plurality of telephones through the primary phone number of the first multiline subscriber in the telephone exchange system, the controller for the telephone exchange system:

verifying a service class of the second multiline subscriber and the third multiline subscriber to form a conference group among the first multiline subscriber, the second multiline subscriber, and the third multiline subscriber, forming the conference group if formation of the conference group is approved through the verifying of the service class, and ignoring the request for forming the conference group if formation of the conference group is not approved through the verifying of the service class.

16. The telephone exchange system of claim 15, further comprised of the controller maintaining communication between the second multiline subscriber and the third multiline subscriber if at least one of the second multiline subscriber and the third multiline subscriber is registered for a privacy class, and, if not, the controller forming the conference group amoung the first multiline subscriber, the second multiline subscriber, and the third multiline subscriber.

* * * * *